United States Patent
Root et al.

(10) Patent No.: US 6,317,133 B1
(45) Date of Patent: Nov. 13, 2001

(54) GRAPHICS PROCESSOR WITH VARIABLE PERFORMANCE CHARACTERISTICS

(75) Inventors: Gary Root, Harleysville; Richard J. Selvaggi, Doylestown, both of PA (US)

(73) Assignee: ATI Technologies, Inc., Thornhill (CA)

( * ) Notice: Subject to any disclaimer, the term of this patent is extended or adjusted under 35 U.S.C. 154(b) by 0 days.

(21) Appl. No.: 09/156,149

(22) Filed: Sep. 18, 1998

(51) Int. Cl.[7] .................................................. G06F 15/16
(52) U.S. Cl. ........................... 345/503; 345/441; 345/619
(58) Field of Search ..................................... 345/418, 419, 345/429, 431, 433, 441, 443, 501, 503, 523, 581, 589, 643

(56) References Cited

U.S. PATENT DOCUMENTS

| | | | | |
|---|---|---|---|---|
| 5,347,618 | * | 9/1994 | Akeley | 345/421 |
| 5,657,436 | * | 8/1997 | Ashburn | 345/441 |
| 5,684,936 | * | 11/1997 | Otto | 345/421 |
| 5,732,204 | * | 3/1998 | Fukushima et al. | 345/427 |
| 5,754,182 | * | 5/1998 | Kobayashi | 345/423 |
| 5,841,443 | * | 11/1998 | Einkauf | 345/430 |
| 5,905,500 | * | 5/1999 | Kamen et al. | 345/419 |
| 5,949,440 | * | 9/1999 | Krech, Jr. et al. | 345/506 |
| 6,061,066 | * | 5/2000 | Priem | 345/427 |
| 6,160,557 | * | 12/2000 | Narayanaswami | 345/422 |
| 6,188,412 | * | 2/2001 | Morein | 345/523 |

* cited by examiner

Primary Examiner—Ulka J. Chauhan
(74) Attorney, Agent, or Firm—Vedder, Price, Kaufman & Kammholz (57) ABSTRACT

A graphics processing device includes a variable performance setup engine that processes vertexes of polygons to create surface coefficients, and a rasterizer that processes the surface coefficients to create pixel values corresponding to each pixel location within each polygon. The variable performance setup engine is structured so as to provide the surface attributes of each polygon within a time that is correlated to the size of the polygon. In this manner, the overall polygon processing rate will be substantially related to the size of the polygon. By providing a short processing time for small polygons, and a longer processing time for larger polygons, the image processing rate is shown to be less dependent upon the sizes of the polygons that comprise the image. The invention thereby provides for an overall image processing rate that is substantially independent of the complexity of the image being rendered.

23 Claims, 7 Drawing Sheets

GRAPHICS PROCESSOR WITH VARIABLE PERFORMANCE CHARACTERISTICS

FIELD OF THE INVENTION

The invention relates generally to graphics image processing and more particularly to the processing of vertex data for rendering an image on a display.

BACKGROUND OF THE INVENTION

Graphics image processing is a computationally intensive process that is structured hierarchically to optimize the use of special purpose hardware and software. Complex images are created as, or partitioned into, smaller areas that have definable characteristics, and each of these smaller areas are processed to provide the details required to determine the value that is assigned to each individual picture element (pixel) in a display.

In conventional graphics image processing systems, the complex images consist of a combination of polygon areas, typically triangular areas, that form the image. The complex images are processed by software on a general purpose processor to produce characteristics that are associated with each of the polygon areas. The characteristics of the polygon areas are encoded as attributes that are associated with each vertex of the polygon that encloses the area. For example, each vertex includes a color attribute that defines the color at that vertex. The color at points between two vertexes is determined thereafter by an interpolation of the colors at each vertex. In the general case, the attribute values at the vertexes of each polygon define the coefficients that are used to determine the value at any location on the surface defined by the polygon.

Figure 1A:
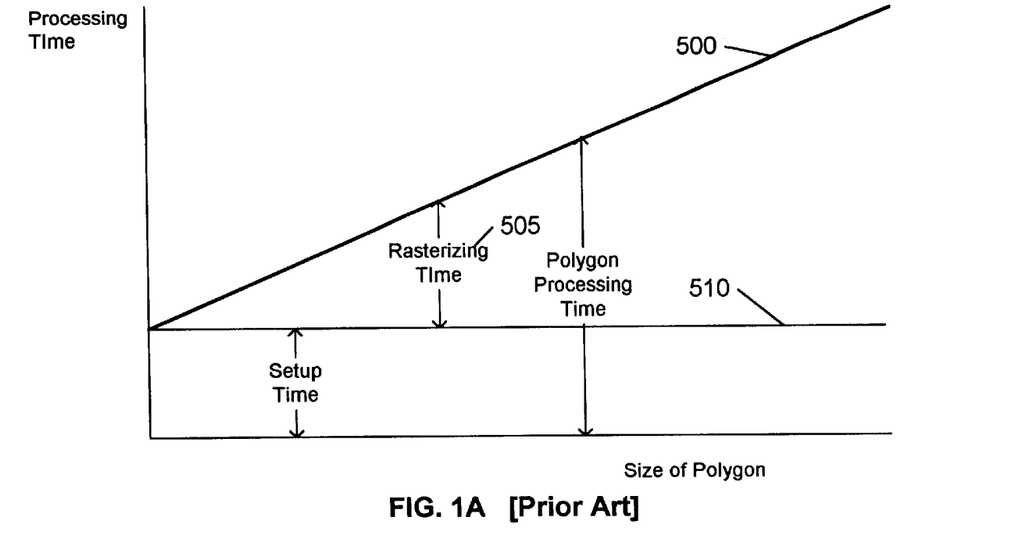
FIGS. 1A and 1B illustrates example graphs of the time required to process polygons and images.

The attributes associated with each vertex of each polygon are communicated to a special purpose graphics processing device. The graphics processing device typically consists of a setup engine and a rasterizer. The setup engine processes the vertexes associated with each polygon to produce surface coefficients. The rasterizer processes the surface coefficients to define each value that is to be displayed for each location within each polygon. The time to process each polygon is the sum of the time required to setup the polygon plus the time to rasterize the polygon. FIG. 1A illustrates the relationship between the size of the polygon and the time to process the polygon. The setup time 510 required by the setup engine to process the vertexes associated with each polygon to produce the surface coefficients is relatively independent of the size of the polygon. The rasterizing time 505 required by the rasterizer to process the surface coefficients is dependent upon the size of the polygon being rendered, because the rasterizer determines a value for each pixel that is contained within the polygon. The total polygon processing time 500 is the sum of setup time 510 and the rasterizing time 505.

Figure 1B:
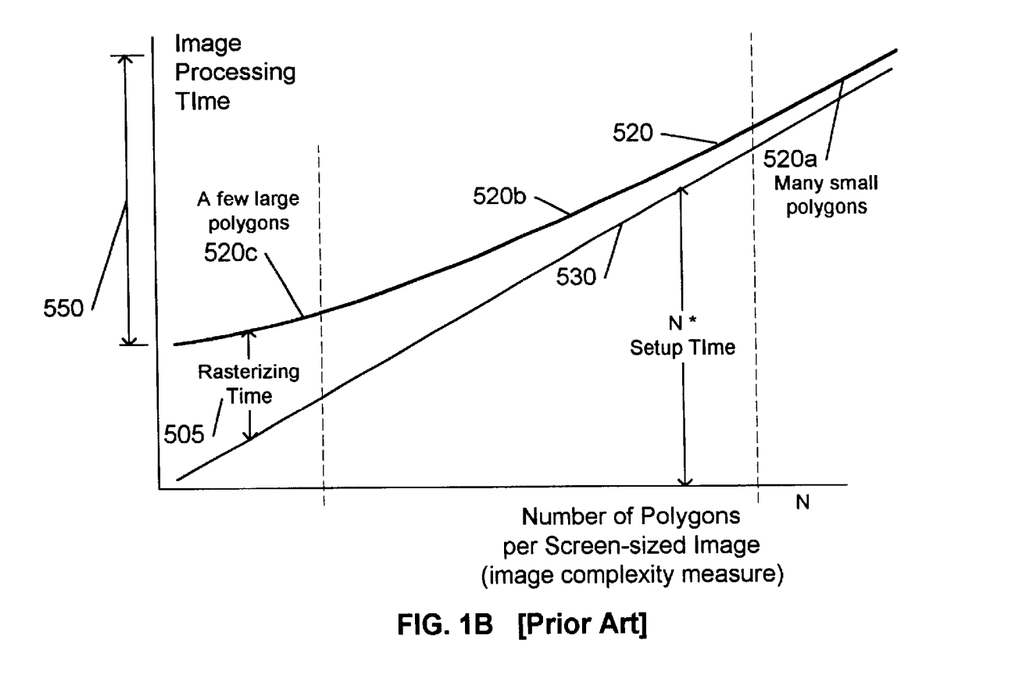

The time required to render a polygon affects the overall image processing rate of the graphics image processing system, because the graphics image processing system cannot continually supply images at a rate that is faster than the rate at which the graphics processing device can render the polygons associated with each image. This dependency results in a decrease in the image processing rate for images having a high amount of detail, because although each of the many small areas representing these details can be rendered quickly, each of these many areas incurs a setup time delay. Conversely, an image that has few details will consist of a few large polygons, and although each polygon consumes a rendering time that is proportional to its size, only a few setup time delays will be incurred. FIG. 1B is presented, for illustrative purposes only, to demonstrate this dependency for images that are rendered to a full screen display. Line 530 represents the linear dependency of the image processing time to the number of polygons being processed. A complex image will consist of many small polygons, as illustrated by region 520a of curve 520. Each of these small polygons will incur the setup time 510 required to determine the surface coefficients, plus a rasterizing time 505. As illustrated by line 530 in FIG. 1B, the primary component of the image processing time 520a is the cumulative time of N polygons times the setup time for each polygon. A relatively simple image, on the other hand, will consist of a few polygons, each of the polygons covering a relatively large portion of the image area, as illustrated by region 520c of curve 520. The primary component of the image processing time for a few large polygons is the rasterizing time 505 to determine the pixel value for each pixel location within each of the large polygons. Region 520b represents the processing of average sized polygons, between the regions of a few large polygons 520c and many small polygons 520a. The span 550 of the image processing time of FIG. 1B illustrates the range of processing time that could be incurred in a conventional system, depending upon the complexity of the image being processed.

In a conventional system, to increase the rate at which the graphics processing device processes polygons, two approaches can be taken. The components that perform the setup function and rasterizing function can be made to operate more quickly, or the device can be structured to allow the setup and rasterizing functions to operate in parallel. Increasing the speed of components has a direct impact on the cost, size, and power dissipation of the device, and is limited by available technology. Alternatively, or in addition to increasing the speed of components, a buffer is provided as the interface between the setup engine and the rasterizer, to allow for parallel operation. The buffer stores the surface coefficients that are produced by the setup engine until the rasterizer processes them. The buffer decouples the setup engine performance from the rasterizer performance, so that the delays of each do not result in a cumulative delay. If the rasterizer consumes a significant amount of time processing the surface coefficients of a large polygon, the buffer allows the setup engine to continue to process the vertexes of subsequent polygons during this time. If small polygons are interspersed among large polygons, a significant rate improvement can be realized. While a large polygon is being rendered, the setup engine processes each of the small polygons. When the rasterizer completes the rasterization of the large polygon, it commences the rasterization of each of the small polygons. Because the rasterization is substantially dependent upon the size of the polygon being rendered, each of the small polygons are rendered quickly. To allow for this parallel processing and resultant rate improvement, the buffer must be sufficiently sized so as to allow the setup engine to continue to process the vertexes of multiple subsequent polygons while a large polygon is being rendered.

With ever increasing advances in graphics image processing to provide for realistic renderings, the details associated with graphics images continually increases. This increase in detail has had a substantial impact on the conventional graphics processing devices, in two areas. The increase in realism requires an increase in the amount of data corresponding to the coefficients required to describe the polygon surfaces, and the time required to process this increased amount of data increases. Because the amount of data associated with each vertex attribute is larger, the conventional buffer is insufficiently sized to allow the setup engine to process a large number of subsequent vertex attributes while the rasterizer is processing the large polygons. Therefore, the buffer is less able to decouple the setup engine performance from the rasterizer performance, and the setup time is more likely to affect the overall image processing performance, as illustrated in FIG. 1B.

The overall image processing performance is limited by the upper bound of the span 550 of the image processing time in FIG. 1B, because the image processing system must provide an image processing rate that is independent of the content of the particular images being rendered.

Consequently, there exists a need for a graphics processing device and method for processing graphics data that provides for an image processing rate that is substantially independent of the image complexity.

DETAILED DESCRIPTION OF A PREFERRED EMBODIMENT OF THE INVENTION

The disclosed invention provides a method and apparatus for processing polygons for rendering on a display having a high image processing rate and a minimal buffering requirement. The graphics processing method and apparatus includes a variable performance setup engine that produces surface attributes corresponding to each polygon, and a rasterizer that provides the pixel values corresponding to each polygon based on the surface attributes. The variable performance setup engine is structured so as to provide the surface attributes of each polygon within a time that is correlated to the size of the polygon. In this manner, the overall polygon processing rate will be substantially related to the size of the polygon. By providing a short processing time for small polygons, and a longer processing time for larger polygons, the image processing rate is shown to be less dependent upon the sizes of the polygons that comprise the image. The invention thereby provides for an overall image processing rate that is substantially independent of the complexity of the image being rendered.

Although the invention is applicable to polygons of any general form, the invention described herein uses the processing of triangular areas as an example application, for clarity. As presented, the principles of this invention can be applied without the use of additional buffers. In a preferred embodiment the use of buffers and other optimization techniques are employed, to further improve performance, as would be common in the art.

Figure 2:
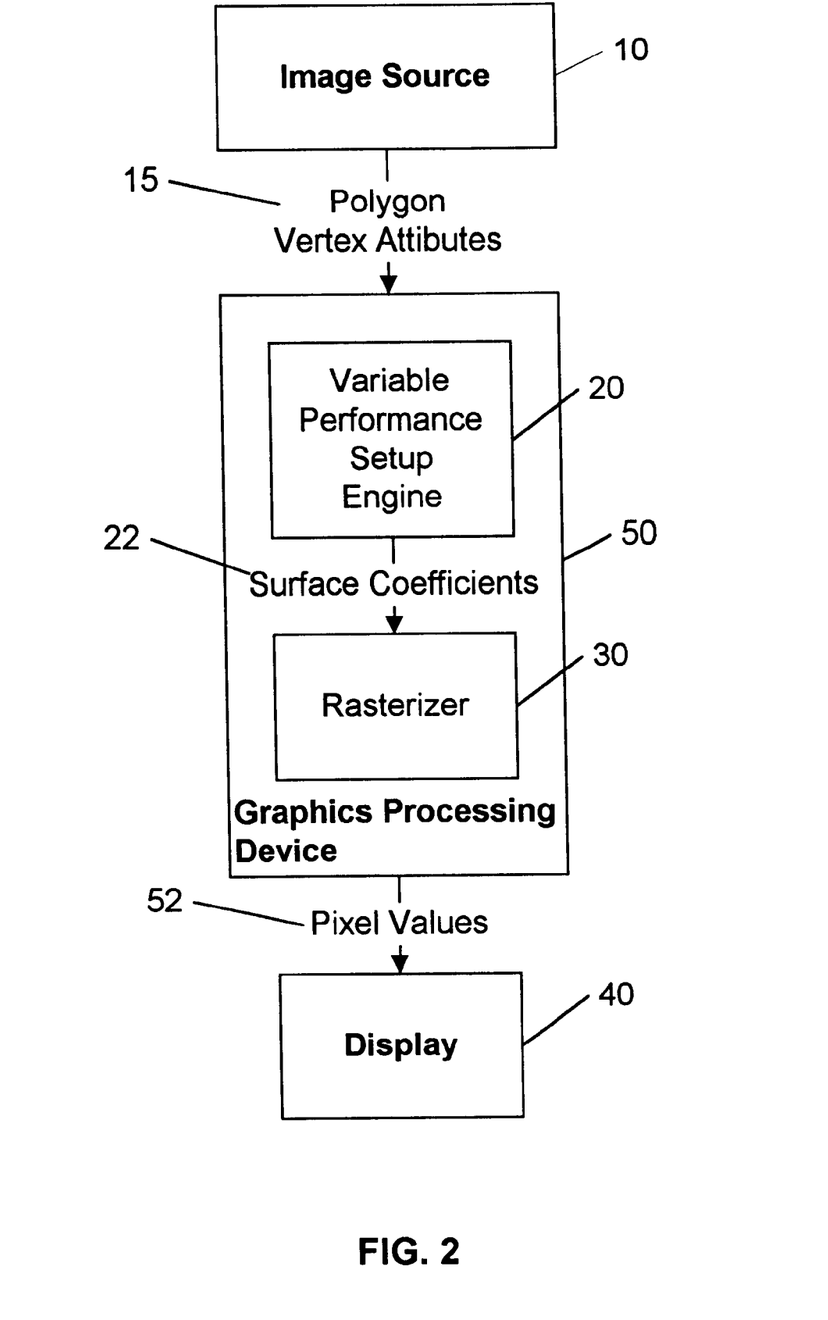
FIG. 2 illustrates a graphics processing system in accordance with this invention.

FIG. 2 illustrates an example block diagram of a graphics system in accordance with this invention. The graphics system includes an image source 10, a graphics processing device 50, and a display 40. The graphics processing device 50 includes a variable performance setup engine 20 and a rasterizer 30. The image source 10 provides vertex attributes 15 that define each polygon that forms the image by the attribute values at each vertex of each polygon. The variable performance setup engine 20 processes each polygon's vertex attributes 15 to determine surface coefficients 22 that define, algorithmically, how to determine a rendering value corresponding to each location within the polygon. The rasterizer 30 traces a path that covers the location of each picture element (pixel) within the polygon and uses the surface coefficients 22 to determine the pixel value 52 that is to be rendered by the display 40 at each of these locations.

Figure 3A:
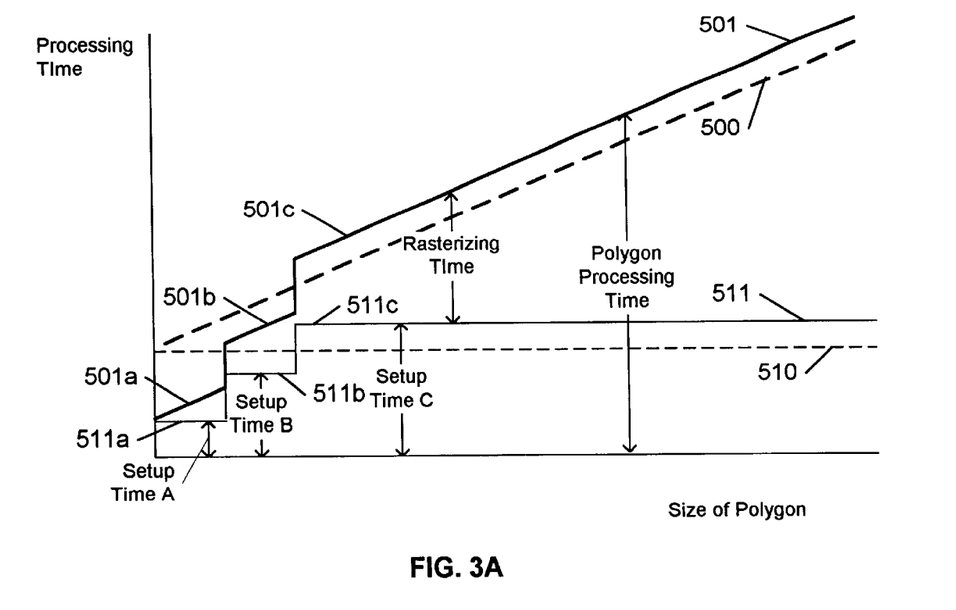
FIGS. 3A and 3B illustrates example graphs of the time required to process polygons and images in accordance with this invention.

The variable performance setup engine 20 is designed so as to provide a setup time that is dependent upon the size of the polygon. An example of the performance of the variable performance setup engine 20 is illustrated by line 511 in FIG. 3A. The variable performance setup engine 20 in this example provides for three setup times, setup time A 511a, setup time B 511b, and setup time C 511c. Setup time A 511a represents the time required by the variable performance setup engine 20 to setup small triangles; setup time B 511b represents the time required by the variable performance setup engine 20 to setup moderately sized triangles; and setup time C 511c represents the time required by the variable performance setup engine 20 to setup large triangles. The conventional setup time 510 is illustrated in FIG. 3A as a dashed line, for reference. Setup time C 511c is illustrated in FIG. 3A as being greater than the conventional setup time 510 for illustrative purposes. As will be subsequently discussed, the variable performance setup engine 20 includes components that are not contained in a conventional setup engine; therefore, setup time C 511c is illustrated in FIG. 3A as being greater than that which could be achieved by the conventional setup time 510, given the same cost and size constraints.

As above, the polygon processing time 501 is the sum of the setup time 511 plus the rasterization time 505. As illustrated in FIG. 1A, because setup time A 511a is less than the conventional setup time 510, the polygon processing time 501a for small triangles is less than the conventional polygon processing time 500. Because setup time C 511c may be greater than the conventional setup time 510, the polygon processing time 501c for large triangles is illustrated as being larger than conventional polygon processing time 500. The polygon processing time 501b for moderately sized triangles is preferably less than the conventional polygon processing time 500. As illustrated in FIG. 1A, as compared to the conventional graphics processing device, the graphics processing device 50 in accordance with this invention provides variable performance characteristics 501a, 501b, and 501c in dependence upon the size of the polygons that comprise the image.

Figure 3B:
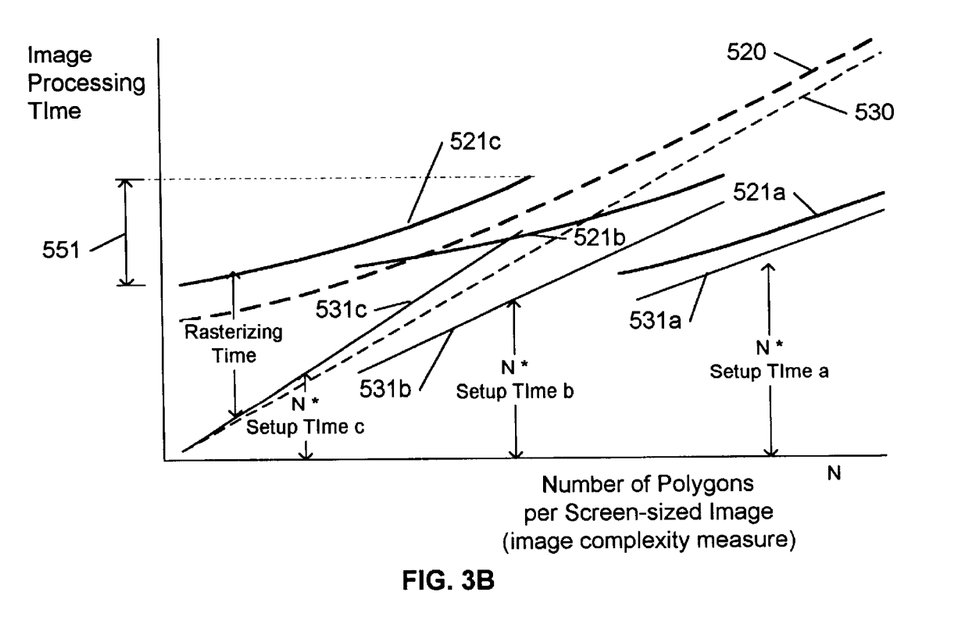

FIG. 3B illustrates the effect that the variable performance characteristics of graphics processing device 50 has on the overall image processing time. As discussed above, the primary component of the processing time for a very complex image, having many small triangles, is the cumulative setup times. In accordance with this invention, the setup time A 511a is less than the conventional setup time 510; therefore, the number of polygons N times the setup time A 511a, illustrated as line segment 531a, is substantially less than the conventional cumulative setup time 530. As such, the overall image processing time 521a for processing many small triangles is substantially less than the conventional image processing time 520. Moderately sized triangles preferably incur less setup time 531b, and therefore the overall image processing time 521b for moderately complex images is generally less than the conventional image processing time 520. Conversely, a simple image, comprising a few large triangles, may incur a processing time 521c than is greater than the conventional processing time 520, if the setup time C 511c for large triangles is larger than the conventional setup time 510. As illustrated by the foreshortening of the line 521c in FIG. 3B, however, the number of large triangles that can be included in an image is, in general, limited. For example, if an image has a size X, and consists of triangles of size Y, the number of triangles of size Y is limited to X/Y, assuming no overlapping triangles. If the size Y is large, X/Y must be small; if the size Y is moderate, X/Y is a moderate number; if the size Y is small, X/Y must be large. This relationship between the size of the triangles and the number of triangles is illustrated by the location, relative to the horizontal axis, of the foreshortened line segments 521a, 521b, and 521c.

Thus, as illustrated, the variable performance characteristics of the graphics processing device 50 may provide for a performance that is greater or less than that of a conventional graphics processing device, depending upon the complexity of the image. However, as illustrated by span 551, the overall image processing time is limited to the range of the foreshortened line segments 521a, 521b, and 521c. As can be seen, in accordance with this invention, the span 551 of image processing time is substantially less than the span 550 of image processing time of the conventional graphics processing device.

Figure 4:
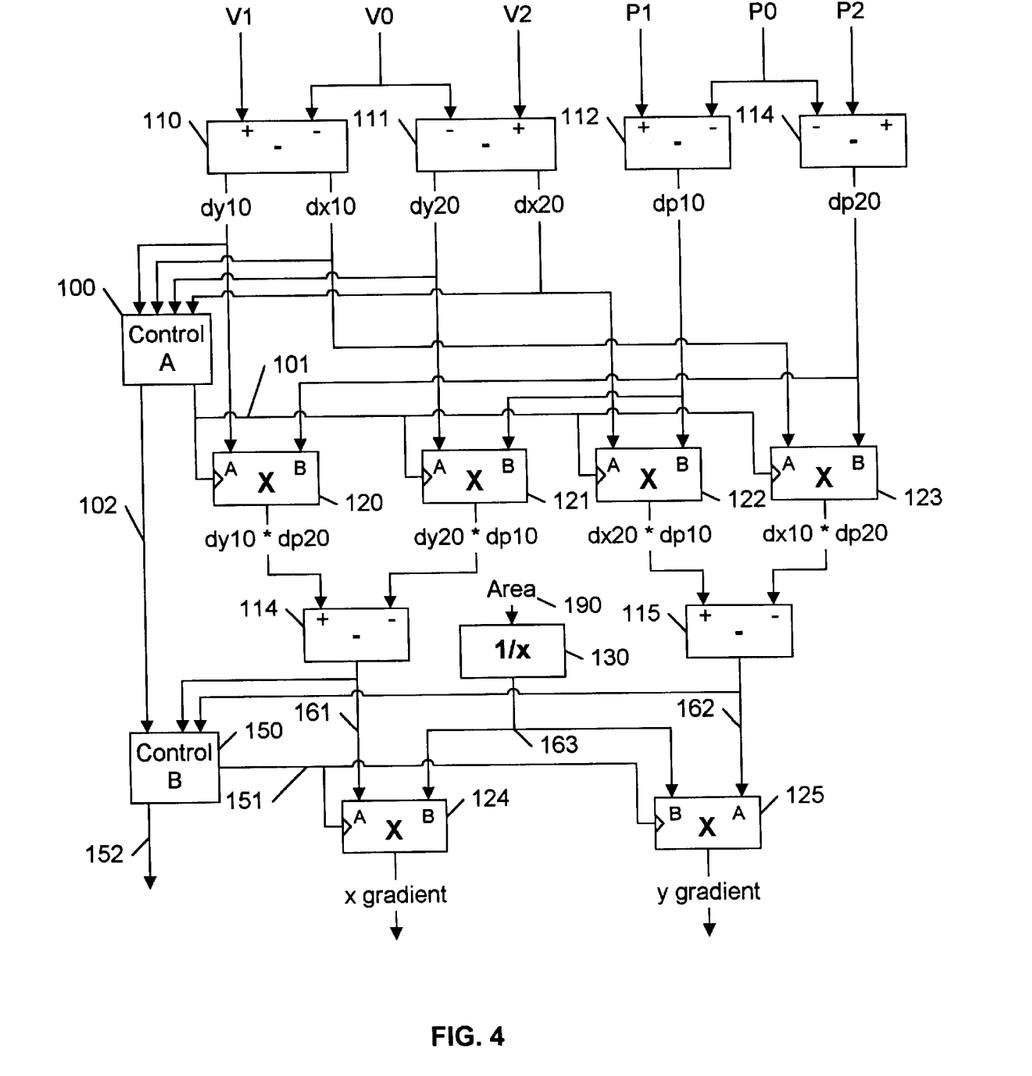
FIG. 4 illustrates an example block diagram of a variable performance setup engine in accordance with this invention.

FIG. 4 illustrates an example block diagram of a portion of a variable performance setup engine 20 that effects the variable performance characteristics in accordance with this invention. The setup engine receives the coordinates of vertexes V0, V1, V2 and parameter values P0, P1, P2 that are associated with each of these vertexes V0, V1, V2. The setup engine determines the rate of change, or gradient, of the parameter with respect to an incremental change of location within the polygon in the horizontal (x) and the vertical (y) directions. For example, the parameters P0, P1, and P2 may be the brightness of the polygon at each vertex V0, V1, V2. The setup engine determines the x-gradient and y-gradient of the brightness parameter. In this simple example, the rasterizer determines the brightness for all the pixel locations between the vertexes by incrementally adding the x-gradient to each prior pixel value as it computes the pixel values across a line in the x dimension, and by adding the y-gradient as it progresses to the next line in the y dimension. The setup engine also processes other parameters, such as color, texture, and visibility. These gradients, and combinations of gradients and other factors, comprise the surface coefficients 22 that are provided to the rasterizer 30 for rendering each pixel within each triangle.

As is common in the art, the x and y gradients of a parameter are determined by the equations:

x-gradient=((dy10*dp20)-(dy20*dp10))/area;

y-gradient=((dx20*dp10)-(dx10*dp20))/area, where dx10, dx20, dy10, dy20, dp10, dp20 are defined below, and area is a measure of the area of the triangle.

The three vertexes are compared in the subtractors 110 and 111 to determine the extent of the triangle in the x and y dimensions. Subtractor 110 compares vertex V1 to vertex V0 and determines dx10, the difference between the x coordinate of vertex V1 and the x coordinate of vertex V0, and dy10, the difference between the y coordinate of vertex V1 and the y coordinate of vertex V0. Similarly subtractor 111 compares vertex V2 to vertex V0 and determines dx20, the difference between the x coordinate of vertex V2 and the x coordinate of vertex V0, and dy20, the difference between the y coordinate of vertex V2 and the y coordinate of vertex V0. Subtractor 112 determines dp10, the difference between the parameter value at vertex V1 and the parameter value at vertex V0. Subtractor 113 determines dp20, the difference between the parameter value at vertex V2 and the parameter value at vertex V0.

The sequential multipliers 120, 121, 122, and 123 determine the intermediate products in the above equations dy10*dp20, dy20*dp10, dx20*dp10, and dx10*dp20, respectively. Subtractors 114 and 115 determine the intermediate factors ((dy10*dp20)-(dy20*dp10)) 161 and ((dx20*dp10)-(dx10*dp20)) 162 of the above equations, respectively. The reciprocal determinator 130 determines the inverse 163 of the area 190, and sequential multipliers 124 and 125 multiply the intermediate factors 161 and 162 by the inverse 163 of the area 190 to form the x and y gradients, respectively.

Figure 5A:
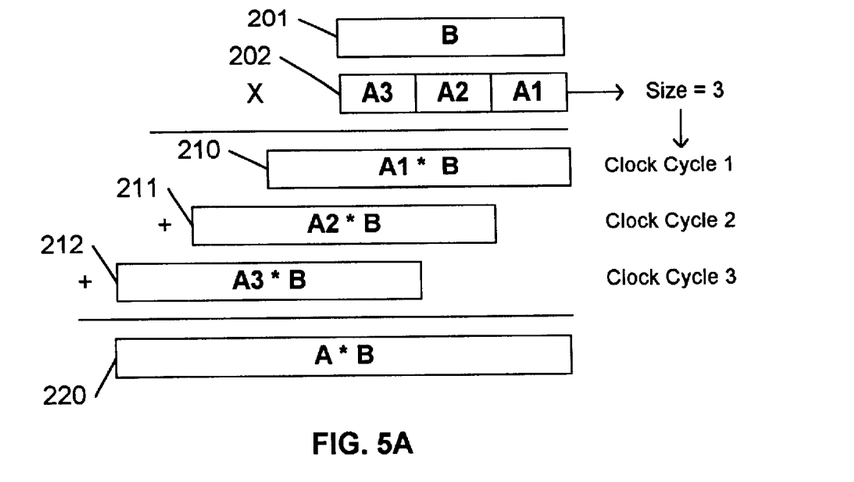
FIGS. 5A–5C illustrate examples of a sequential multiplication process in accordance with this invention.

The variable performance characteristics of the variable performance setup engine 20 is effected by controlling the operation of the sequential multipliers 120, 121, 122, 123, and optionally sequential multipliers 124 and 125, in dependence upon the size of the multiplicands being multiplied. As is common in the art, a variety of techniques are available for performing complex multiplications via a sequence of simpler multiplications; one such technique being illustrated in FIG. 5A. FIG. 5A represents the multiplication of two numbers A 202 and B 201, which are each 24 bits wide, as a three step process. The number A 202 consists of 3 eight bit submultiplicands A1, A2, and A3. A first subproduct 210 of A1*B is produced during clock cycle 1. A second subproduct 211 of A2*B is produced during clock cycle 2, and a third subproduct 212 of A3*B is produced during clock cycle 3. Each subproduct 211 and 212 is shifted by eight bits relative to the previous subproducts 210 and 211, and the product 220 of A*B is the sum of the appropriately shifted subproducts 210, 211, and 212. By performing the multiplications as a three-step process, each step only requires the multiplication of a 24 bit number (B) by an eight bit, or one byte, number (A1, A2, A3), rather than a direct 24 by 24 bit multiplication. In general, because of the sequential nature of this multiplication process, the three step 8 bit by 24 bit sequential multiplier is slower than a non-sequential 24 bit by 24 bit multiplier, but can be implemented with fewer components than the 24 bit by 24 bit multiplier. Other techniques for performing sequential arithmetic operations that minimize the complexity of the operation to be performed, at the expense of the time required to effect the operations, are common in the art.

Figure 5B:
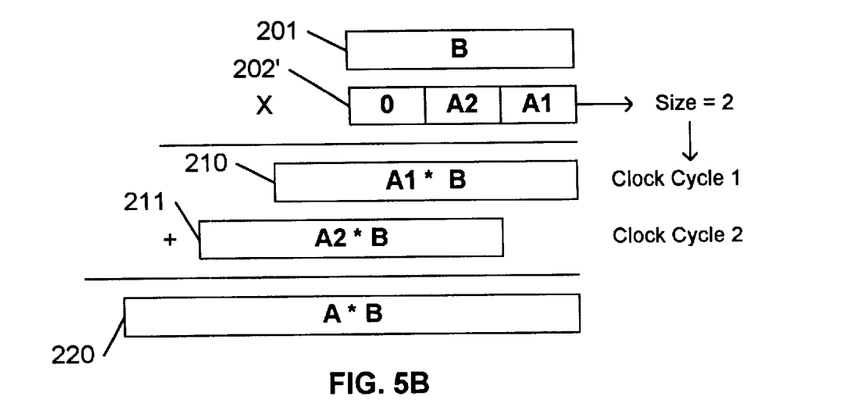
Figure 5C:
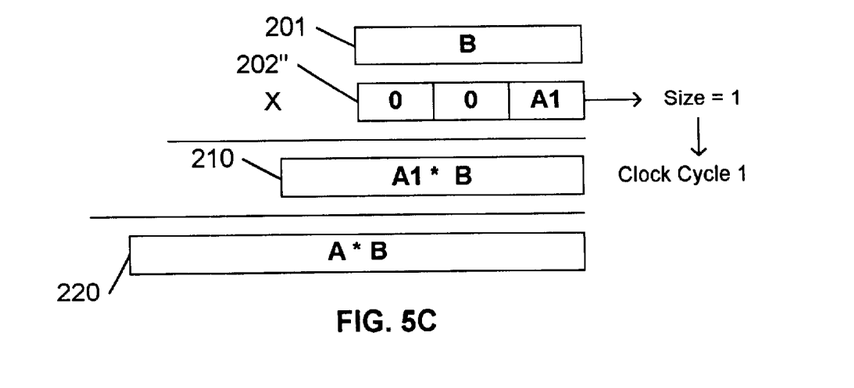

FIG. 5B illustrates the reduction of the three step multiplication process of FIG. 5A to a two step process, and FIG. 5C illustrates the reduction to a one step process. In FIGS. 5B and 5C the size of the A multiplicand is determined, in terms of the number of 8 bit bytes required to contain the particular value of the A multiplicand. A value of A that has a 0 in A3 and a non-zero in A2 has a size of 2 bytes; a value of A that has a 0 in both A3 and A2 has a size of 1 byte. FIG. 5B illustrates the sequential multiplication of A*B when A has a size of two. The subproducts 210 and 211 are computed as above, but the step of computing the third subproduct 212, which is known to be zero, is bypassed. FIG. 5C illustrates the sequential multiplication of A*B when A has a size of one, wherein the steps of computing the second subproduct 211 and third subproduct 212 are bypassed. In this manner, multiplications with multiplicands that are small in size are performed faster than multiplications with multiplicands that are large in size. As is common in the art, the reduction in clock cycles can be effected directly or indirectly. In a direct implementation, the size of the multiplicand is determined a priori, and the sequential multiplier is controlled by providing it with the appropriate number of clock pulses corresponding to the size. In the indirect approach, the sequential multiplier determines whether the bytes A1, A2, and A3 that are remaining to be multiplied by B to form subproducts 210, 211, and 212 are zero, and asserts a "done" signal when the remaining subproduct cycles can be bypassed. Thus, the "done" signal may be asserted before or after one clock cycle, two clock cycles, or three clock cycles, depending upon the size of the multiplicand. Upon receipt of the "done" signal, the subsequent processes are free to immediately use the formed product A*B 220, without necessarily waiting for three clock cycles. For ease of understanding, the invention is subsequently presented herein using the direct determination of the number of clock cycles required to effect the multiplication, although the indirect method can be employed as well, as would be evident to one of ordinary skill in the art.

The extents of the triangle dx10, dy10, dx20, and dy20 are correlated to the size of triangle. If each of the extents dx10, dy10, dx20, and dy20 are small, the triangle represented by vertexes V0, V1, and V2 must be small. The control A 100 determines the size of each of the extents dx10, dy10, dx20, and dy20, and determines the minimum number of clock cycles required to produce the intermediate products dy10*dp20, dy20*dp10, dx20*dp10, and dx10*dp20, based on these extents. Each of the sequential multipliers 120, 121, 122, and 123 could be independently controlled, based on the size of each of the extents dy10, dy20, dx20, and dx10, respectively. However, if any of the extents dx10, dy10, dx20, dy20 are larger in size than any of the others, the subsequent processes, such as the subtractions at 114 and 115 and the multiplications at 124 and 125, must wait until the subproduct from the larger sized extent is available. Therefore, to ease the timing and synchronization tasks, the control A 100 determines the minimum number of clock cycles required to effect the multiplications at 120, 121, 122, and 123 based upon the extent dx10, dy10, dx20, dy20 having the largest size. The control A 100 provides the clock pulses 101 to the sequential multipliers 120, 121, 122, and 123 to effect the sequential multiplications for the determined minimum number of clock cycles. The control A 100 also generates a control signal 102 that signals the completion of the determined minimum number of clock cycles. That is, the control signal 102 signals when the outputs of the sequential multipliers 120, 121, 122, and 123 are available for subsequent processing.

As would be evident to one of ordinary skill in the art, the control A 100 may use other criteria in addition to or in lieu of the size of the extents of the polygons to effect an optimization in processing time. For example, the control A 100 may use the area 190, or the area of a bounding box that includes the polygon, as an input, and forces a limited number of clock cycles for small areas. This is effected by forcing the multipliers 120, 121, 122, and 123 to bypass of the production of the first subproduct 210 of FIGS. 5A–5C, regardless of the value of each corresponding A1. The first subproduct 210 directly affects the precision, or resolution, of the rendering of the polygon; the lack of high precision introduced by bypassing the production of the first subproduct 210, however, may not be visually apparent in a small area. Similarly, the control A 100 may use the differences dp10 and dp20 of the parameter values in conjunction with, or in lieu of, the area 190 to determine whether the first subproduct 210 is required for precision. This determination may also be dependent upon the type of parameter, such as whether the parameter is color, visibility, brightness, hue, and so on. For example, the human visual system is more sensitive to brightness than to color. The control A 100 may force the bypass of the production of the first subproduct 210 when the gradient of the color is being determined for a small triangle, but not when the gradient of the brightness of this same triangle is being determined. In a similar manner, for draft-quality, or low-resolution, renderings of an image, less precision is necessary than for a high-quality, or high-resolution, rendering. In draft mode, the control A 100 is structured to control the multiplication stages so as to bypass the production of the first subproduct 210, thereby reducing the setup time by a third for all polygons. These and other control and optimization techniques will be apparent to one of ordinary skill in the art.

Optionally, control B 150 similarly determines the number of clock cycles required to effect the multiplications at 124 and 125 based on the larger of the sizes of the intermediate factors ((dy10*dp20)-(dy20*dp10)) 161 and ((dx20*dp10)-(dx10*dp20)) 162. Control A 100 provides the control signal 102 that informs control B 150 when to begin the multiplications at 124 and 125. Control B 150 provides the determined number of clock pulses 151 to the sequential multipliers 124 and 125, and asserts a control signal 152 when the determined minimum number of clock cycles are completed.

Figure 6:
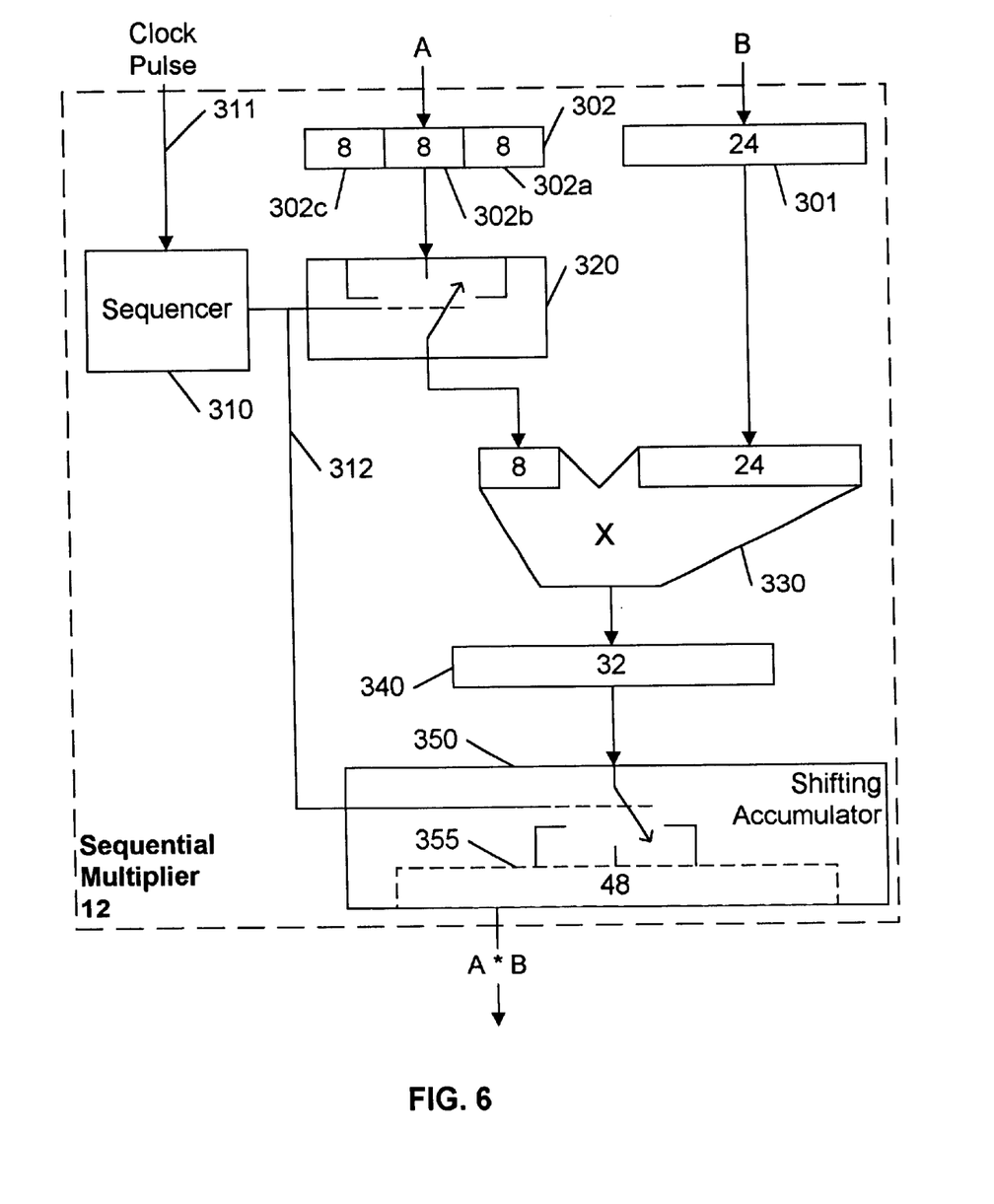
FIG. 6 illustrates an example block diagram of a sequential multiplier in accordance with this invention.

FIG. 6 illustrates an example block diagram of a sequential multiplier 12 that may be used to implement the sequential multipliers 121–125 to facilitate the variable performance characteristics of this invention. The sequential multiplier 12 forms the product A*B of two 24 bit numbers A, B via the repetitive use of an 8 bit by 24 bit multiplier 330, and shifting accumulator 350, under the control of a sequencer 310. The 24 bit number A is contained in three 8 bit registers 302a, 302b, and 302c; the 24 bit number B is contained in a 24 bit register 301. The sequencer 310 output 312 controls a switcher 320 to sequentially select registers 302a, 302b, and 302c in response to each clock pulse 311. The clock pulse 311 corresponds, for example, to the output 101 or 151 of control A 100 and control B 150, respectively. At the first clock pulse, the contents of register 302a are provided to the multiplier 330. The multiplier 330 forms a 32 bit subproduct in register 340 corresponding to the contents of register 302a (submultiplicand A1 of FIGS. 5A–5C) multiplied by the contents of 301 (B). Under the control of the sequencer 310 output 312, the shifting accumulator 350 adds the subproduct in register 340 to the lower 32 bits of an accumulator register 355. It is assumed herein that the shifting accumulator 355 is initialized to zero at the start of each polygon processing cycle, using initialization techniques common in the art. At the next clock pulse 311, if any, the sequencer 310 sets the output 312 to control the switcher 320 to provide register 302b to the multiplier 330. The multiplier 330 forms a 32 bit subproduct in register 340 corresponding to the contents of register 302b (A2 of FIGS. 5A–5C) multiplied by the contents of 302 (B). Under the control of the sequencer 310 output 312, the shifting accumulator 350 adds the contents of the register 340 to the $9^{th}$ through $40^{th}$ bits of the accumulator register 355. At the next clock pulse 311, if any, the sequencer 310 sets the output 312 to control the switcher 320 to provide register 302c to the multiplier 330. The multiplier 330 forms a 32 bit subproduct in register 340 corresponding to the contents of register 302c (A3 of FIGS. 5A–5C) multiplied by the contents of 302 (B). Under the control of the sequencer 310 output 312, the shifting accumulator adds the contents of the register 340 to the 17$^{th}$ through 48$^{th}$ bits of the accumulator register 355. At the end of each clock cycle, the accumulator register 355 contains the running subtotal of the subproducts computed thus far. Thus, if the control A 100 of FIG. 4 determines that the largest size of the extents dx10, dy10, dx20, dy20 is two, then only two clock pulses 101 are asserted. At the end of the second clock cycle, the accumulator register 355 of each of the sequential multipliers 120, 121, 122, and 123 contains the completed product, and the control signal 102 is asserted to signal this completion.

Figure 7:
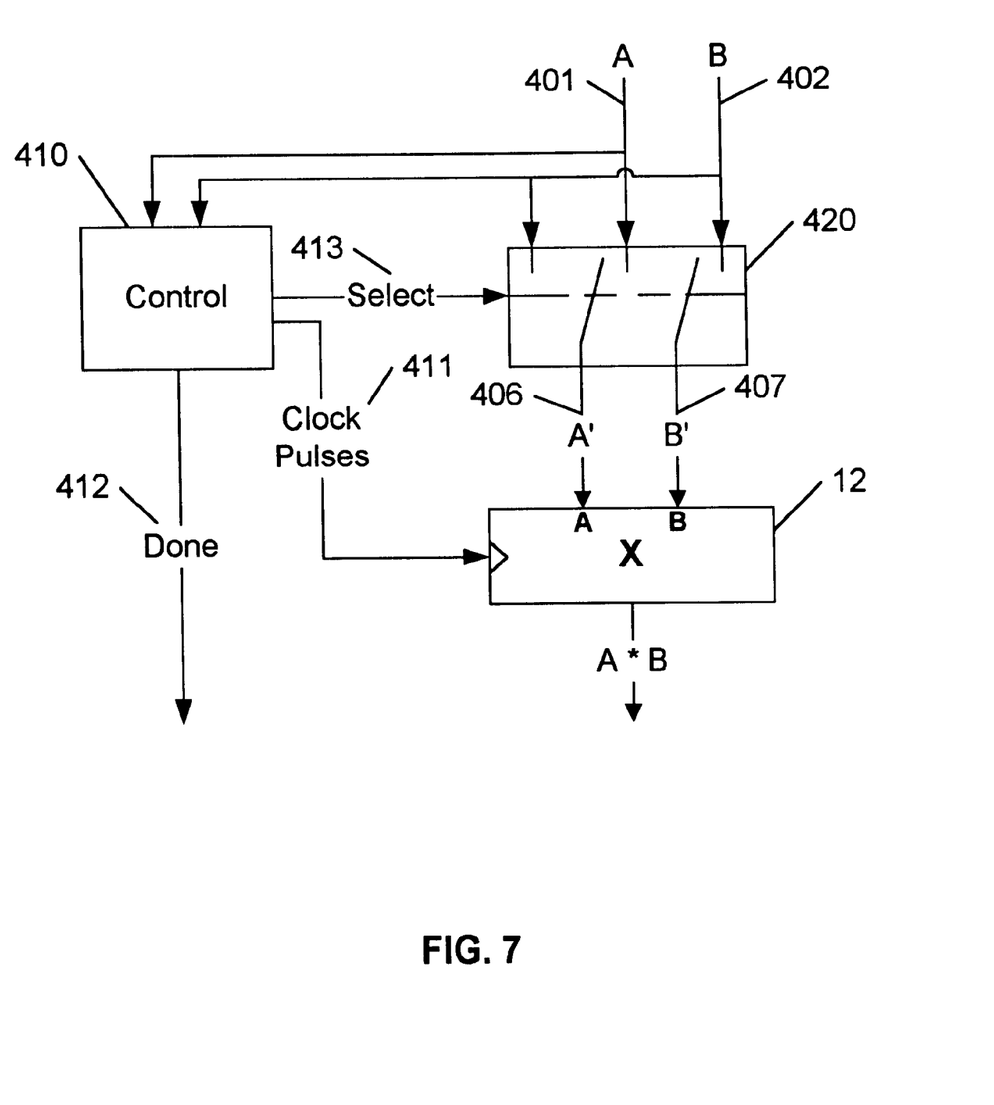
FIG.7 illustrates an example block diagram of an alternative embodiment of a sequential multiplication device in accordance with this invention.

In FIG. 4, the control A 100 uses the extents dx10, dx20, dy10, dy20 to determine the minimum number of clock pulses required to effect the multiplication of each extent with the appropriate parameter differences dp10, dp20. Some small triangles may, however, have a large extent in one dimension, and a small extent in the other, such as, for example, a long narrow triangle. The largest extent determines the number of clock cycles required, and may not result in a short setup time for such triangles. In accordance with another aspect of this invention, the parameter differences dp10 and dp20 are also used to determine the minimum number of clock cycles required to effect the multiplication of the parameter differences and the extents. In an alternative embodiment of this invention, the sequential multipliers 120, 121, 122, and 123 use whichever multiplicand is smaller in size as the partitioned multiplicand A in FIGS. 5 and 6. In this manner, for example, if the horizontal extent dx10 between vertex V1 and V0 has a size of 3 bytes, and the parameter difference dp20 has a size of one byte, the sequential multiplier 123 produces the intermediate product dx10*dp20 in one clock cycle. FIG. 7 illustrates an example block diagram to effect this selection of multiplicands. Each multiplicand A 401 and B 402 are provided to a control 410 and a switch 420. The control 410 associated with each multiplier 12 replaces the single control A 100 of FIG. 4. The control 410 compares the sizes of multiplicands A 401 and B 402, and asserts the select 413 signal to the switch 420 so as to connect the smaller of A 401 and B 402 to A' 406 and the larger of A 401 and B 402 to B' 407. The smaller multiplicand A' 406 is provided to the partitioned A input of the sequential multiplier 12. The control 410 provides the determined minimum number of clock pulses to the sequential multiplier 12 to effect the sequential multiplication of A*B, based on the size of the smaller multiplicand A' 406. In the above example of multiplier 123, dp20 will be switched to the A input and dx10 to the B input of the multiplier 123, and one clock pulse 411 will be provided by the control 410. Upon completion of the determined minimum number of clock cycles, the control 410 asserts the done 412 signal. The logical AND of the done 412 signals from each of the controls 410 associated with each of the multipliers 120, 121, 122, and 123 provides the control signal 102 that signals the completion of all the subproduct multiplications in FIG. 4. Because, in general, the parameter differences dp10 and dp20 of a triangle have a relatively high correlation to the size of the triangle, this alternative embodiment increases the likelihood that small triangles will be processed within a small number of clock cycles.

It should be understood that the implementation of other variations and modifications of the invention in its various aspects will be apparent to those of ordinary skill in the art, and that the invention is not limited by the specific embodiments described. For example, the sequential multiplier 12 is described herein as a 3 cycle 8 bit by 24 bit multiplier. The number of cycles and the bit width of the multiplicands may be any convenient set of cycles and widths to effect the desired degree of precision in the product. Similarly, the accumulator register 355 is illustrated as being 48 bits wide, although a smaller register may be used if less precision is required. In a like manner, the variable performance characteristics of FIG. 3 is presented as a 3 tiered setup function, for the general classification of "small", "medium", and "large" polygons. As would be evident to one of ordinary skill in the art, additional tiers may be provided to further optimize performance as a more detailed function of the polygon size. The invention as presented may be implemented in hardware, software, firmware, or a combination of each. For example, the control A 100 and control B 150, as well as the subtractors 110–115 may be embedded software routines in a processing device or computer, and the multipliers 120–125 may be special purpose hardware multipliers. Similarly, although six multipliers 120–125 are illustrated in FIG. 4, the multiplication operations performed by these multipliers 120–125 may be performed by a fewer number of multipliers 12 that are time-shared, or multiplexed, to effect each operation. It is therefore contemplated to cover by the present invention, any and all modifications, variations, or equivalents that fall within the spirit and scope of the basic underlying principles disclosed and claimed herein.

What is claimed is:

1. A graphics processing device for producing pixel values from vertex attributes of a polygon, the graphics processing device comprising:

a variable performance setup engine that processes the vertex attributes to produce surface coefficients, and     a rasterizer, operably coupled to the variable performance setup engine that produces the pixel values corresponding to the polygon based on the surface coefficients,     wherein the processing of the vertex attributes occurs during a number of clock cycles and the variable performance setup engine dynamically adjusts the number of clock cycles for processing at least one of the vertex attributes.

2. The graphics processing device of claim 1, wherein the variable performance setup engine dynamically adjusts the number of clock cycles in dependence upon extents of the polygon.

3. The graphics processing device of claim 1, wherein the variable performance setup engine dynamically adjusts the number of clock cycles in dependence upon a measure of area of the polygon.

4. The graphics processing device of claim 1, wherein the variable performance setup engine dynamically adjusts the number of clock cycles in dependence upon at least one difference between the vertex attributes.

5. The graphics processing device of claim 1, wherein the variable performance setup engine dynamically adjusts the number of clock cycles in dependence upon whether the graphics processing device is in a low-resolution mode or a high-resolution mode.

6. The graphics processing device of claim 5, wherein a determination of whether the graphics processing device is in the low-resolution mode or the high-resolution mode is based on a measure of the area of the polygon.

7. The graphics processing device of claim 1, wherein the variable performance setup engine includes:

at least one subtractor that determines an extent of the polygon based on a difference between the vertex attributes, a sequential multiplier, operably coupled to the at least one subtractor, that forms an intermediate product based on the extent, the intermediate product being formed during the number of clock cycles, and a controller, operably coupled to the subtractor and the sequential multiplier, that determines the number of clock cycles based on the extent.

8. The graphics processing device of claim 1, wherein the variable performance setup engine includes:

a multiplier that produces a plurality of subproducts, each subproduct of the plurality of subproducts being produced at an each clock pulse corresponding to the number of clock pulses, a shifting accumulator, operably coupled to the multiplier, that accumulates a shifted sum of the plurality of subproducts, and a control, operably coupled to the multiplier and the shifting accumulator, that determines the number of clock pulses and provides the each clock pulse to the multiplier.

9. A setup engine comprising:

a first subtractor that determines a first difference between two vertex coordinates of a polygon, the first difference having a first size, a second subtractor that determines a second difference between two vertex parameters of the polygon, the second difference having a second size, means for determining a product of the first difference and the second difference in dependence upon at least one of the first size based on the two vertex coordinates and the second size based on the two vertex parameters to facilitate variable performance of the setup engine depending upon extents of the polygon.

10. The setup engine of claim 9, wherein the means for determining the product includes:

a selector that selects between the first difference and the second difference to form a first multiplicand and a second multiplicand based on the first size and the second size, the first multiplicand having a smaller size than the second multiplicand, the first multiplicand including a plurality of submultiplicands, a sequential multiplier that sequentially multiplies the second multiplicand by each of a subset of the plurality of submultiplicands to form a plurality of subproducts, and an accumulator that accumulates the subproducts to form a product of the first difference and the second difference, wherein the subset of the plurality of submultiplicands is dependent upon at least one of the first size and the second size.

11. The setup engine of claim 10, wherein the subset of the plurality of submultiplicands is further dependent upon a resolution mode.

12. The setup engine of claim 9, wherein the vertex coordinates correspond to vertexes of a triangle, and the means for determining the product is also based on a measure of the area of at least one of the triangle and a bounding box that includes the triangle.

13. The setup engine of claim 11, wherein the resolution mode is dependent upon a parameter type of the vertex parameters.

14. A method for processing vertex data, comprising the steps of:

determining a first difference between a coordinate of a first vertex and a corresponding coordinate of a second vertex, determining a second difference between a parameter value of the first vertex and a corresponding parameter value of the second vertex, determining a first size of the first difference, determining a number of clock cycles that is dependent upon the first size, partitioning the first difference into a number of submultiplicands, the number of submultiplicands being related to the number of clock cycles, multiplying the second difference with each submultiplicand of the number of submultiplicands to produce a plurality of subfactors, accumulating each of the plurality of subfactors to produce a product of the first difference and the second difference.

15. The method of claim 14, further including the steps of:

determining a second size of the second difference, and interchanging the first difference and the second difference and the corresponding first size and second size before determining the number of clock cycles.

16. The method of claim 14, wherein:

the step of determining the number of clock cycles further includes the steps of:

determining a resolution mode, and determining the number of clock cycles based also on the resolution mode; and, the step of partitioning the first difference into a number of submultiplicands is also dependent upon the resolution mode.

17. The method of claim 16, wherein the step of determining the resolution mode is dependent upon a parameter type of the parameter value.

18. The method of claim 16, wherein the step of determining the resolution mode is dependent upon a measure of area corresponding to a polygon that is associated with the first and the second vertexes.

19. The method of claim 14, further including the step of determining a plurality of pixel values corresponding to a polygon that is associated with the first and second vertexes based on the product of the first and the second differences.

20. The method of claim 19, further including the step of displaying the pixel values on a display device.

21. A setup engine comprising:

a first subtractor that determines a first difference between two vertex coordinates, the first difference having a first size, a second subtractor that determines a second difference between two vertex parameters of the second difference having a second size, means for determining a product of the first difference and the second difference in dependence upon at least one of the first size and the second size including a selector that selects between the first difference and the second difference to form a first multiplicand and a second multiplicand based on the first size and the second size, the first multiplicand having a smaller size than the second multiplicand, the first multiplicand including a plurality of submultiplicands, a sequential multiplier that sequentially multiplies the second multiplicand by each of a subset of the plurality of submultiplicands to form a plurality of subproducts, and an accumulator that accumulates the subproducts to form a product of the first difference and the second difference, wherein the subset of the plurality of submultiplicands is dependent upon at least one of the first size and the second size.

22. The setup engine of claim 21, wherein the subset of the plurality of submultiplicands is further dependent upon a resolution mode.

23. The setup engine of claim 22, wherein the resolution mode is dependent upon a parameter type of vertex parameters.

* * * * *